(12) United States Patent
Kandasamy

(10) Patent No.: US 12,266,270 B2
(45) Date of Patent: Apr. 1, 2025

(54) AUTONOMOUS AERIAL VEHICLE SYSTEM

(71) Applicant: Dushan Kandasamy, London (GB)

(72) Inventor: Dushan Kandasamy, London (GB)

( * ) Notice: Subject to any disclaimer, the term of this patent is extended or adjusted under 35 U.S.C. 154(b) by 375 days.

(21) Appl. No.: 17/251,788

(22) PCT Filed: Jun. 12, 2019

(86) PCT No.: PCT/IB2019/054926
§ 371 (c)(1),
(2) Date: Dec. 12, 2020

(87) PCT Pub. No.: WO2019/239355
PCT Pub. Date: Dec. 19, 2019

(65) Prior Publication Data
US 2021/0217318 A1    Jul. 15, 2021

(30) Foreign Application Priority Data
Jun. 14, 2018  (GB) ...................................... 1809765

(51) Int. Cl.
*G08G 5/00* (2006.01)
*B64C 39/02* (2023.01)

(52) U.S. Cl.
CPC ......... *G08G 5/0043* (2013.01); *B64C 39/024* (2013.01); *G08G 5/0013* (2013.01); *G08G 5/0034* (2013.01); *G08G 5/0069* (2013.01); *B64U 2201/104* (2023.01)

(58) Field of Classification Search
CPC .. G08G 5/0013; G08G 5/0034; G08G 5/0043; G08G 5/0069; B64U 50/34; B64U 50/35; B64U 2201/104; B64C 39/024
USPC ............................................................ 701/20
See application file for complete search history.

(56) References Cited

U.S. PATENT DOCUMENTS

| | | | |
|---|---|---|---|
| 9,421,869 B1 * | 8/2016 | Ananthanarayanan | B60L 53/38 |
| 10,099,561 B1 * | 10/2018 | Ananthanarayanan | B60L 53/32 |
| 10,293,936 B1 * | 5/2019 | Conn | B64U 30/20 |
| 10,586,464 B2 * | 3/2020 | Dupray | G08G 5/0013 |
| 11,127,071 B2 * | 9/2021 | Rodriguez Bravo | G05D 1/0808 |
| 11,133,684 B1 * | 9/2021 | Maurer | B60L 53/36 |

(Continued)

FOREIGN PATENT DOCUMENTS

| | | | |
|---|---|---|---|
| CN | 211032239 U | * | 7/2020 |
| CN | 212231135 U | * | 12/2020 |

*Primary Examiner* — Joshua E Rodden

(57) ABSTRACT

The present invention discloses an autonomous aerial vehicle system to provide a plurality of autonomous delivery vehicle, such as drone with a weight carrying capacity. The components of drone are disposed in the frisbee like shell which facilitates to take flight in the same manner and capacity as of a frisbee. The drone provides 360-degree rotation and the pioneering velocity driven movement capabilities. The system further includes a management server in communication with the plurality of autonomous aerial vehicle via a wireless network to schedule a flight plan for the plurality of autonomous aerial vehicle. Each autonomous aerial vehicle includes a control module in communication with the management server is configured to operates the autonomous aerial vehicle according to the flight plan data. The control module receives data includes position data, battery status data, location data of the aerial vehicle to aid the autonomous vehicle to execute the flight plan.

14 Claims, 19 Drawing Sheets

(56) References Cited

U.S. PATENT DOCUMENTS

| | | | |
|---|---|---|---|
| 11,597,291 B1* | 3/2023 | Bikumala | B60L 50/60 |
| 11,628,737 B2* | 4/2023 | McNair | B60L 53/665 |
| | | | 320/109 |
| 2018/0164835 A1* | 6/2018 | Artemiadis | G05D 1/10 |
| 2018/0231971 A1* | 8/2018 | Greenberger | G08G 5/0069 |
| 2018/0286252 A1* | 10/2018 | Park | G08G 5/0043 |
| 2019/0126769 A1* | 5/2019 | Schmalzried | G06Q 10/08 |
| 2019/0185157 A1* | 6/2019 | Blake | G05D 1/104 |
| 2019/0197646 A1* | 6/2019 | Prager | G05D 1/101 |
| 2019/0276147 A1* | 9/2019 | Lee | B64F 1/007 |
| 2021/0039781 A1* | 2/2021 | Yao | G05D 1/101 |
| 2021/0046837 A1* | 2/2021 | Kandasamy | H02S 10/40 |
| 2022/0388654 A1* | 12/2022 | Kandasamy | B64C 25/62 |

* cited by examiner

AUTONOMOUS AERIAL VEHICLE SYSTEM

CROSS REFERENCE TO RELATED APPLICATIONS

The present application claims the benefit of PCT patent application PCT/IB2019/054926 for "AUTONOMOUS AERIAL VEHICLE SYSTEM", filed on Jun. 12, 2019, which further claims the priority f GB Patent Application 1809765.9 for "AUTONOMOUS AERIAL VEHICLE SYSTEM" filed on Jun. 14, 2018, the contents of which is hereby incorporated by reference. The specification of the above referenced patent applications incorporated herein by reference in its entirety.

BACKGROUND OF THE INVENTION

A. Technical Field

The present invention relates generally relates to the field of unmanned aerial vehicles (UAV), and more particularly relates to an autonomous aerial vehicle system to provide a plurality of autonomous aerial delivery vehicle, such as drone with a weight carrying capacity.

B. Description of Related Art

Drones are an aerial vehicle without a human pilot aboard to control the vehicle. These aerial vehicles are controlled either by onboard computers or via remote control by a human operator. Drones are becoming popular in industries like law enforcement, agriculture, or markets because its ability to survey the environment aerially by carrying sensors or cameras. These drones are configured to fly using blades with some onboard computers where a variety of error can occur during operation which includes regulated movement and control during take-off and landing of drone. Without optimum control over the maneuverability, the drones and the operating environment around the drone are prone to potential damage.

Further, controlling drones by a human operator may provide control over the maneuverability. When using multiple UAVs or flying robots to perform tasks, providing simultaneous guiding and control to each UAV by manual operator is not possible.

In light of the foregoing, there exists a long-felt need for an autonomous aerial vehicle system to provide a plurality of autonomous aerial delivery vehicle, such as drone with a weight carrying capacity. Further, there is a need for an autonomous aerial vehicle, such as gyroscopic drone that provides 360° rotation and movement capability with transition of vertical take-off and landing (VTOL) and aero flight mode.

SUMMARY OF THE INVENTION

The present invention related to an autonomous aerial vehicle system to provide a plurality of autonomous delivery vehicle, such as drone with a weight carrying capacity.

According to the present invention, the autonomous aerial vehicle system comprises a plurality of autonomous aerial vehicles or drones, each of the plurality of autonomous aerial vehicle (AAV) comprising at least two propellers configured to rotate in 360-degree. Further, the system comprises a management server in communication with the plurality of autonomous aerial vehicle via a wireless network. The management server comprises a memory for storing data of each drone, and a processor coupled to the memory, configured to schedule a flight plan for the plurality of autonomous aerial vehicle, and communicate the flight plan data to the autonomous aerial vehicle.

In one embodiment, each autonomous aerial vehicle comprises a control module in communication with the management server, a wireless network module in communication with control module and a plurality of sensors in communication with the control module. The control module is configured to receive flight plan data and is stored in the memory module. The plurality of sensors is configured to receive position data of the autonomous aerial vehicle. Further, the control module of the autonomous aerial vehicle is configured to: awake the autonomous aerial vehicle from low power mode; communicate with at least one autonomous aerial vehicle to check for update of flight plan data; store the flight plan data in the memory module of the autonomous aerial vehicle; and operates the autonomous aerial vehicle according to the flight plan data.

In one embodiment, the plurality of autonomous aerial vehicle is in communication to one another via the wireless network module. In one embodiment, each autonomous aerial vehicle further comprises a power module that is configured to check battery status and sends the status to the control module before operation or during operation of the aerial vehicle. In one embodiment, each autonomous aerial vehicle further comprises a GPS module in communication with the control module is configured to determine the location of the autonomous aerial vehicle. Further, the control module is configured to check position data of the autonomous aerial vehicle through the plurality of sensors; send instructions to position the at least two propellers in horizontal position to operates the unmanned aerial vehicle according to the flight plan data; and monitor the location data and position data of the autonomous aerial vehicle till completion of the flight plan.

In one embodiment, each autonomous aerial vehicle further comprises a camera module in communication with the control module configured to rotate in 360 degrees and capture aerial photographs.

In one embodiment, the autonomous aerial vehicle is a gyroscopic drone. In an embodiment construction of the gyroscopic drone is illustrated as follows. The gyroscopic drone provides 360° rotation and the pioneering velocity driven capabilities. Also, the drone has a capability of transitioning from vertical take-off and landing (VTOL) upward movement to an aero/jet turbine movement.

The gyroscopic drone comprises a gyroscopic structure, where at least one or preferably two turbine motors is disposed at the axis or the center of the gyroscopic structure. In an embodiment, the turbine motor comprises either a horizontal motor structure or a vertical motor structure. The turbine motor rotates by 360° about a vertical axis. A turbine assembly is coupled to the motor which shifts the turbine in a cyclical manner enabling an effective and instantaneous turn of direction. The motor providing 360° movement about a vertical axis enables transitioning of vertical take-off and landing (VTOL) upward movement to aero or turbine mode movement. Also, the external rotational motors are configured to cyclically maneuver 360 degrees inside the cyclical hull to alternate the direction once the drone enters the aero flight mode.

In an embodiment, the drone comprises a frisbee structured shell enclosing the functional components of the drone. The Frisbee structured shell facilities flight of the drone in the same manner and capacity as of a Frisbee. In some embodiments, the drone may comprise a camera assembly to capture aerial photographs.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

A more complete understanding of the present invention, and the advantages and features thereof, will be more readily understood by reference to the following detailed description when considered in conjunction with the accompanying drawings wherein:

FIG. 18 illustrates a top view of a cyclical ring arrangement assembled to an air vehicle in an embodiment of the present invention in an embodiment of the present invention.

FIG. 19 illustrates a top view of the cyclical ring arrangement assembled to the helicopter in an embodiment of the present invention.

DETAILED DESCRIPTION OF EMBODIMENTS

A description of embodiments of the present invention will now be given. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention provides an autonomous aerial vehicle system to provide a fully autonomous, highly agile delivery drone with a carrying weight capacity. The system comprises a plurality of autonomous aerial vehicle, which is configured to rotate in 360-degree. Each autonomous aerial vehicle comprises at least two propellers. In one embodiment, each autonomous aerial vehicle comprises at least one propeller. Each propeller comprises a propeller motor controlled by motor controller. The at least two main propellers are positioned centrally on the aerial vehicle and rotates in opposite direction to provide stability to the flight of the autonomous aerial vehicle.

Figure 1:
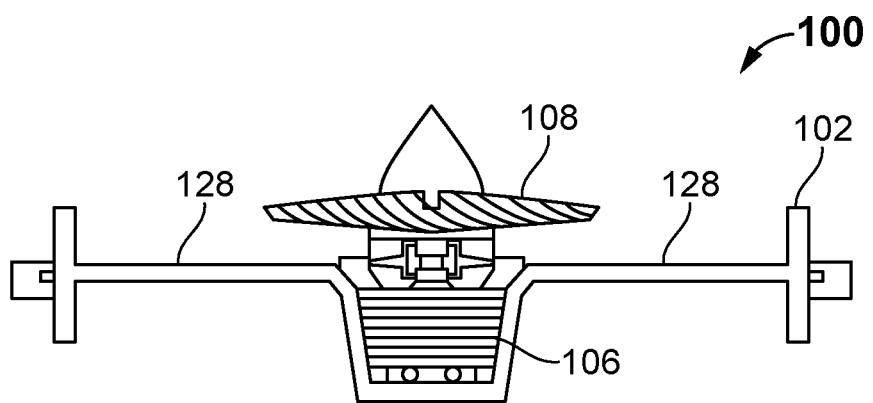
FIG. 1 shows functional components of the autonomous aerial vehicle structure, such as drone, in an embodiment of the invention.

Referring to FIG. 1 through FIG. 10, the autonomous aerial vehicle is a gyroscopic drone 100, in one embodiment of the present invention. In one embodiment, the detailed construction of the gyroscopic drone 100 is described as follows. The gyroscopic drone 100 that provides 360° rotational spin and the pioneering velocity driven movement capabilities. Also, the drone 100 has a capability of transitioning from vertical take-off and landing (VTOL) upward movement to an aero/jet turbine mode movement. Referring to FIG. 1, the gyroscopic drone 100 comprises a gyroscopic structure, where at least one or preferably two turbine motors 102 is disposed at the axis or the center of the gyroscopic structure. In an embodiment, the turbine motor comprises either a horizontal motor structure or a vertical motor structure. The turbine motor 102 rotates in 360° movement about a vertical axis. A turbine assembly 106 is coupled to the motor 102 which shifts the turbine 106 in a cyclical manner enabling an effective and instantaneous turn of direction. The turbine assembly 106 in turn rotates the blades 108. The motor 102 providing 360-degree movement about a vertical axis enables a transitioning of a VTOL upward movement to the aero or turbine mode movement.

Figure 5:
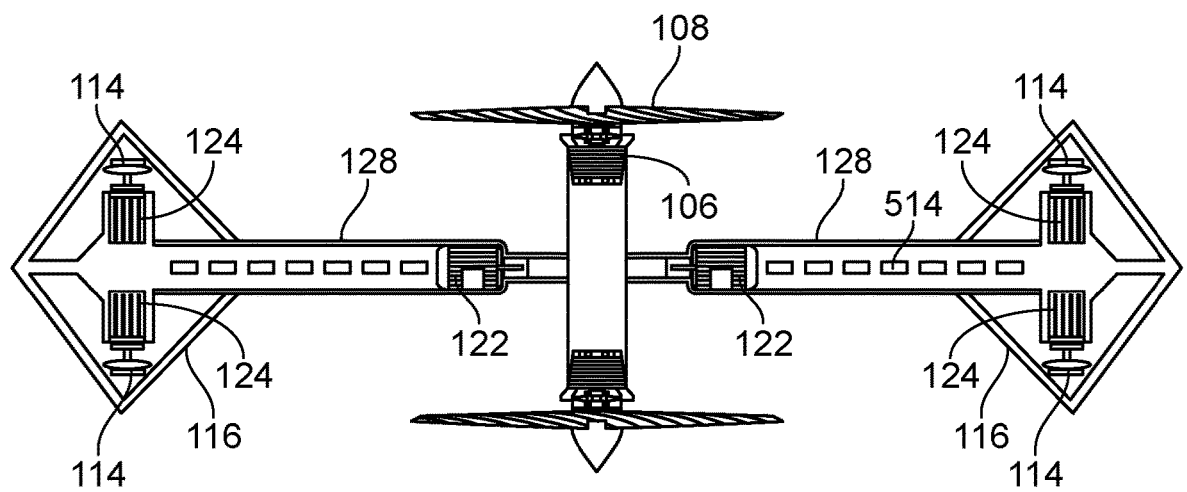
FIG. 5 illustrates horizontal view of the drone in an embodiment of the present invention.

In an embodiment, the drone 100 comprises a shell enclosing the functional components of the drone 100. In an embodiment, the shell may comprise a frisbee 114 like structure operated by the motor 102 and turbine assembly 106 in a balanceable center of gravity manner, as shown in FIG. 5. By utilizing the load enduring capability and leveraging the center of gravity within the middle of the Frisbee shell 114, the drone is able to take-off flight, in the same manner and capacity as of a Frisbee 114. Further, the sturdy structure of the drone 100 and the center of gravity concept enables the drone 100 to move sturdier with equal rigidity.

Figure 2:
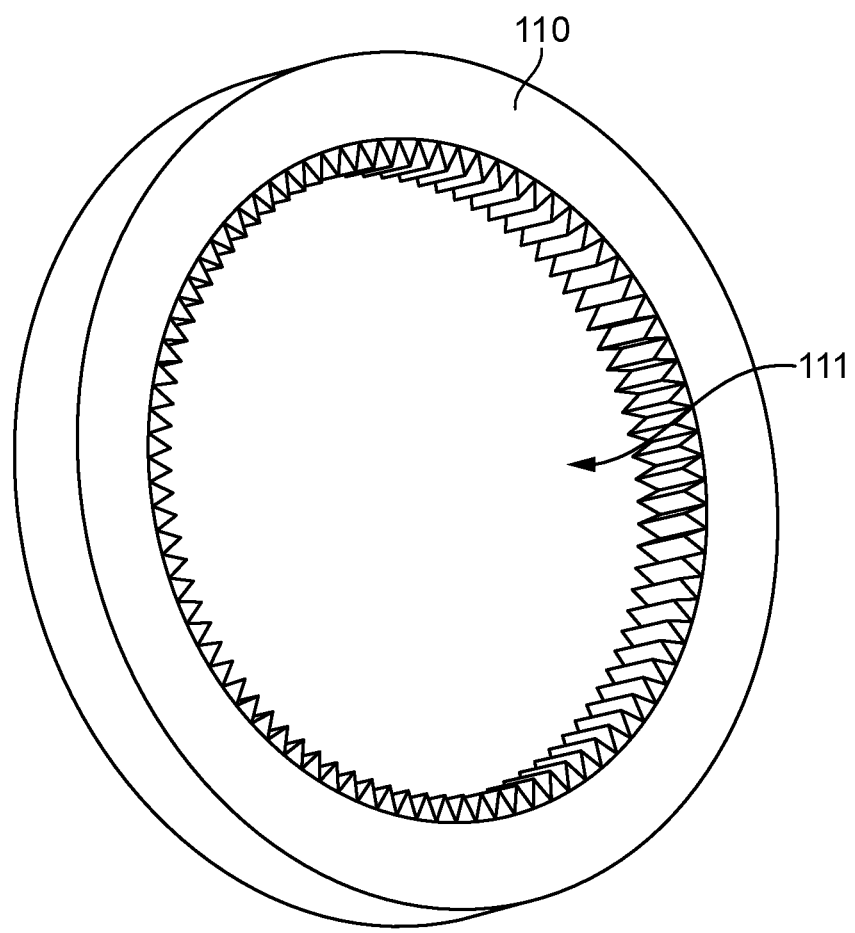
FIG. 2 illustrates internal gearing assembly of the drone in an embodiment of the present invention.

Referring to FIG. 2, in an embodiment, the drone 100 comprises an internal gearing wheel 110 configured to synchronize with the rotation of the opposing motors 102 providing an internal rotating mechanism. The internal construct of the gearing wheel 110 comprises a frisbee like structure, which is represented as 111 in FIG. 2. The frisbee like structure is configured to protect the horizontal opposing motor 102. The internal rotating mechanism enables the twisting function of the turbine motor 102, which in turn facilitates the VTOL and downward acceleration upon a tangent, i.e., 45-degree. The drone 100 exhibits two motor functionalities, one of which is a twisting concept that maneuvers the internal device in a 360-degree about a vertical axis, and the second functionality pushes the internal device in a 360-degree circular horizontal fashion. These two dichotomously functioning units enable the drone 100 to exploit all of the gyroscopic functions. This twisting and flipping mechanism/maneuverability offers VTOL and deceleration as well as 360-degree movement and also enables tangent based movements.

In one embodiment, the utilization of a three-pronged component comprising at least two motors 102 and turbine assembly 106 offers effective durability and versatility in the design concept. In an embodiment, the drone 100 may comprises a camera assembly to capture aerial photographs. In an embodiment, the drone 100 comprises an interconnectable region at the side of the drone 100 that offers to connect different strains of cameras based on the specific requirements. In an embodiment, the drone 100 is configured to offer connection of different types of cameras.

Figure 3:
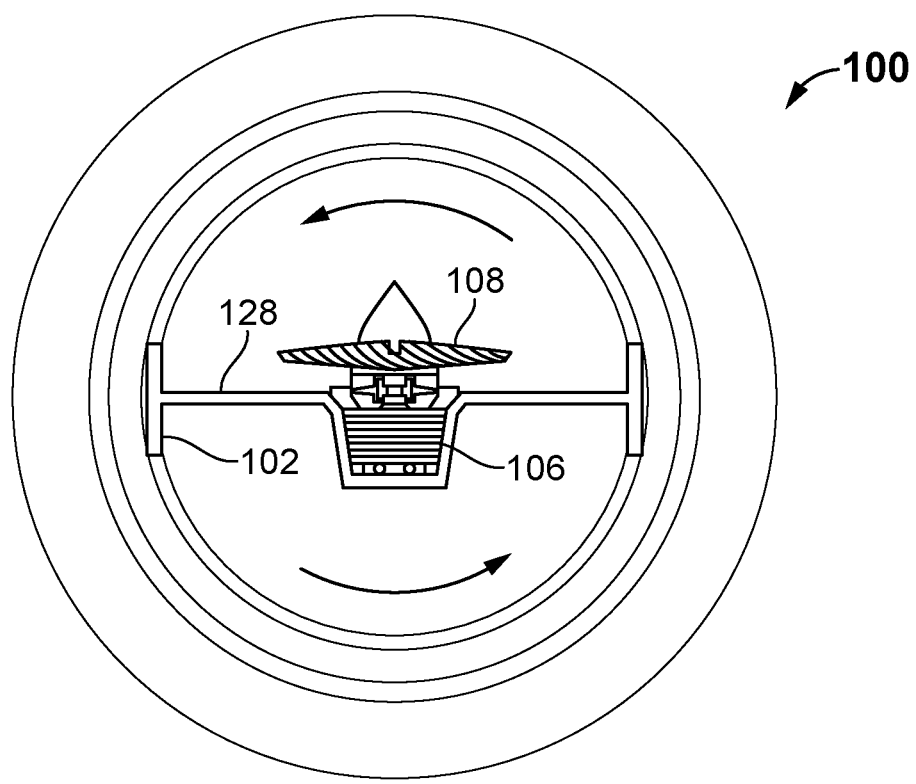
FIG. 3 illustrates the drone showing 360-degree rotational spin in an embodiment of the present invention.
Figure 4:
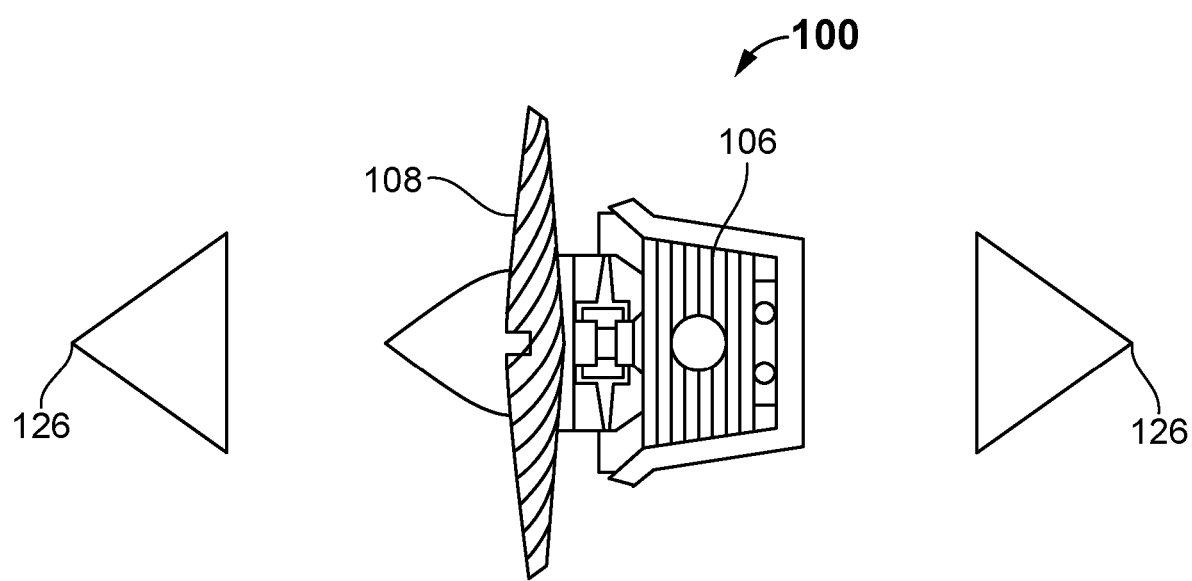
FIG. 4 illustrates the vertical maneuverability of the motor of the drone in an embodiment of the present invention.

Referring to FIG. 3, 360-degree rotational spin of the drone is disclosed in an embodiment of the present invention. In another embodiment, the drone 100 comprises an expansion wing assembly. The motors 102 are coupled to the wing assembly which provides a maximized balance during the flight of the drone 100. In an embodiment, an external facet of the drone 100 may be honed and sharpened to create a most aerodynamically functional edge 126 which enable a maximum utilization of drag and lift, as shown in FIG. 4. Referring to FIG. 1 the drone structure comprising turbine assembly 106 and blades 108 is connected to the external facet of the drone 100 via a bar structure 128.

Figure 6:
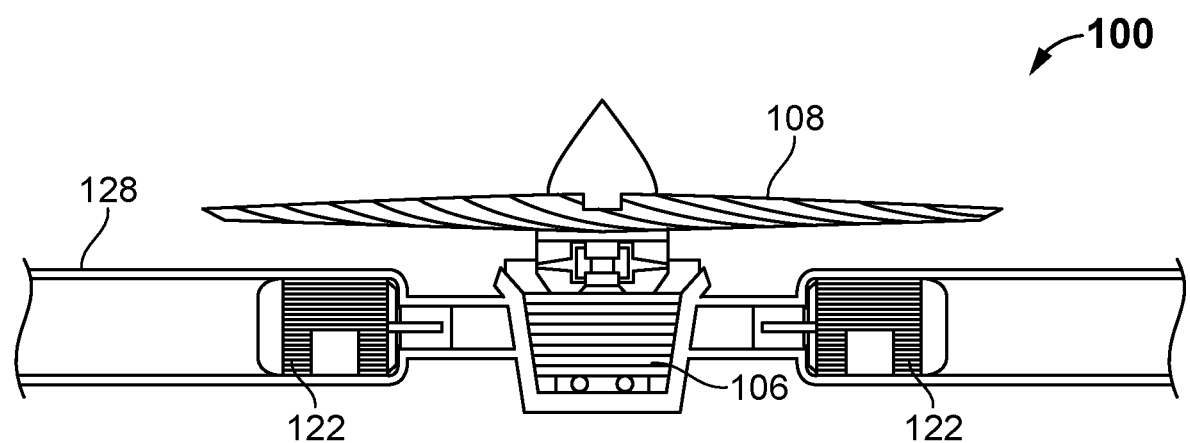
FIG. 6 illustrates a horizontal view of twisting unit mechanism and turbine assembly in another embodiment of the present invention.

In an embodiment, the internal twisting mechanism provides 360° vertical maneuverability of the motors 102, as shown in FIG. 4. Referring to FIG. 5, horizontal view of the drone 100 is illustrated. In an embodiment, the outer hull of the drone 100 is of frisbee shaped structure 114. In an embodiment, the frisbee shaped structure or frisbee unit 114 is formed above the two rotational motors 102. Further, the exterior of the motors 102 includes a triangle enclosure 116. In an embodiment, the frisbee shell 114 and the triangular neb 116 forms the smooth and effective aerodynamic device. In an embodiment, the internal twisting mechanism provides 360° twisting 122 and turning 124 functions of the motors 102, represented by arrow 120. Further, the battery assembly 514 is disposed in a cyclical arrangement. In one embodiment, the battery assembly 514 is disposed within a maneuvering rod inside the cyclical hull of the drone 100. Referring to FIG. 6, a horizontal view of twisting unit 122 mechanism and turbine assembly 106 is illustrated, in another embodiment of the present invention.

Figure 7A:
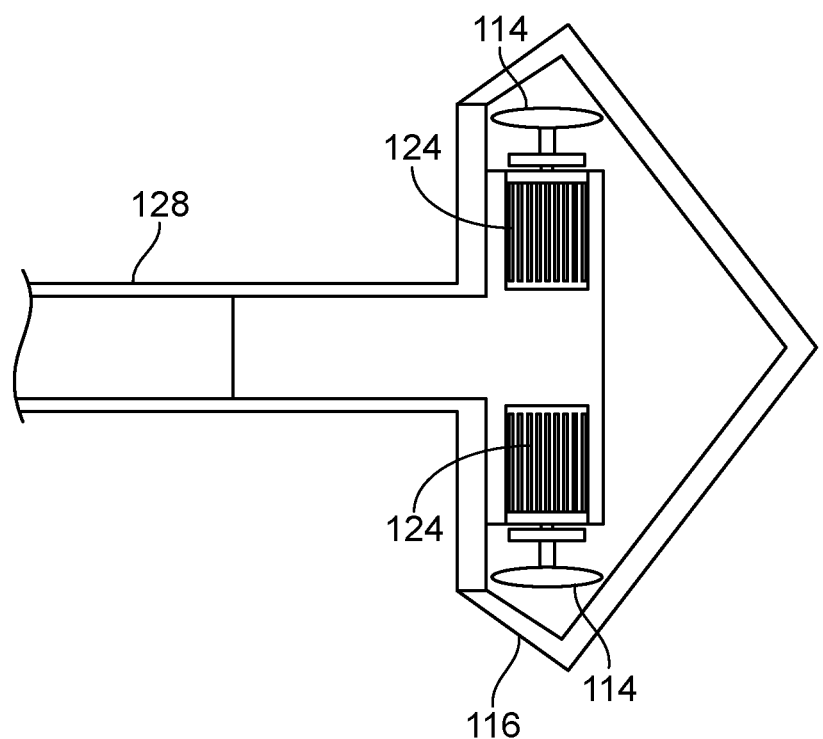
FIG. 7A illustrates a horizontal view of frisbee connected to the vertical motor structure in yet another embodiment of the present invention.
Figure 7B:
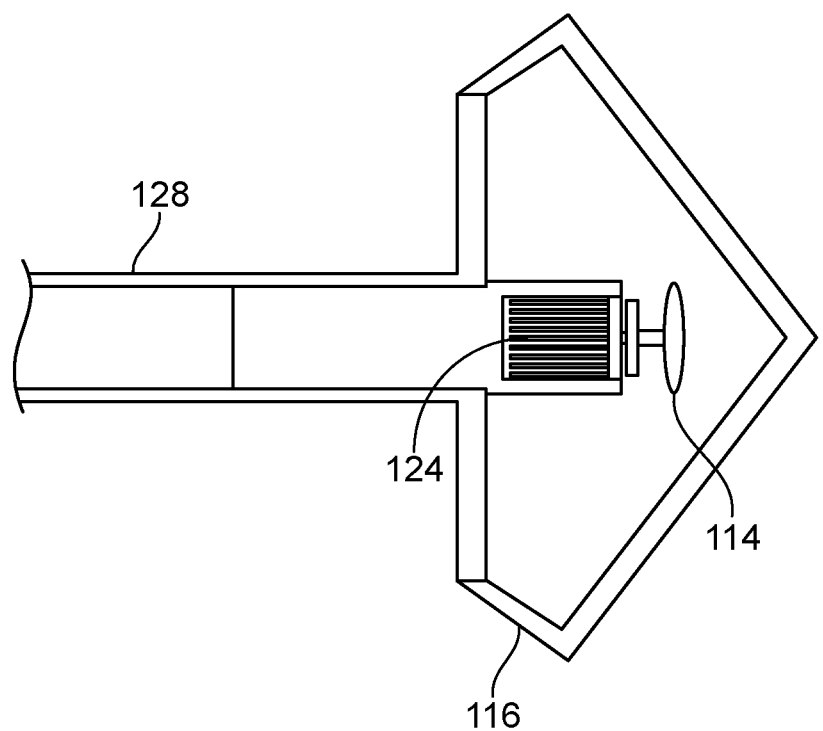
FIG. 7B illustrates a vertical view of frisbee connected to the horizontal motor structure in yet another embodiment of the present invention.

Referring to FIG. 7A, a frisbee 114 connected to each of the vertical motor 102 in yet another embodiment of the present invention. In another embodiment, at least one frisbee unit 114 is positioned at a top and another frisbee unit 114 positioned at a bottom side. The at least two frisbee unit adjoins to form a cyclical shell structure. The frisbee units are connected each other via a plurality of blades. In one embodiment, the at least two frisbee units could be adjoined by any other means. A multiplicity of batteries is disposed at an exterior side of the cyclical shell structure. In one embodiment, cameras are disposed at an exterior side of the cyclical shell structure. The cameras are configured to rotate 360° clockwise or anticlockwise around outer cyclical ring of the drone, at the top and bottom FIG. 7B illustrates a vertical view of the frisbee 114 connected to the horizontal motor 102 structure in yet another embodiment of the present invention. Also, the external rotational motors are configured to cyclically maneuver 360 degrees inside the cyclical hull to alternate the direction when the drone enters the aero flight mode.

Figure 8:
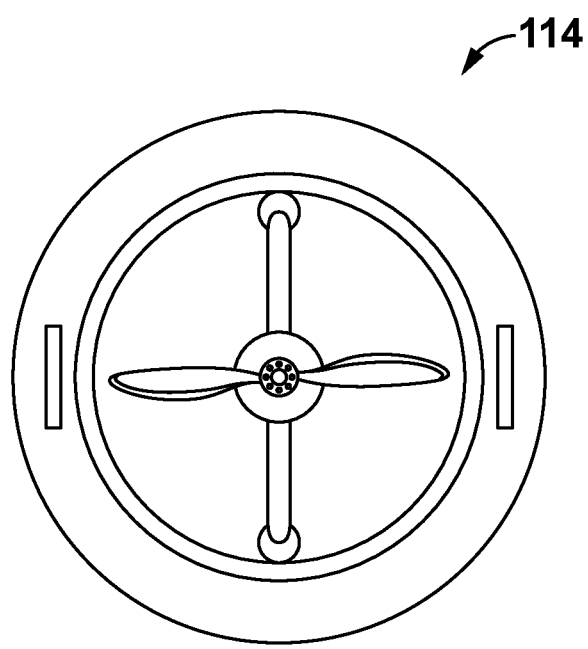
FIG. 8 illustrates a top view of the frisbee unit in yet another embodiment of the present invention.
Figure 9A:
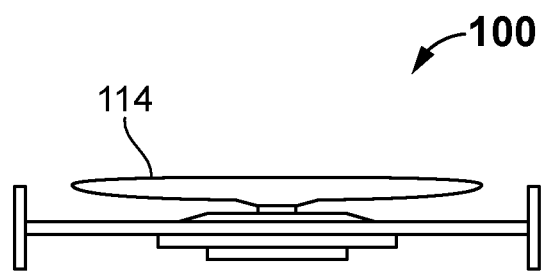
FIG. 9A illustrates a horizontal view of drone in yet another embodiment of the present invention.
Figure 9B:
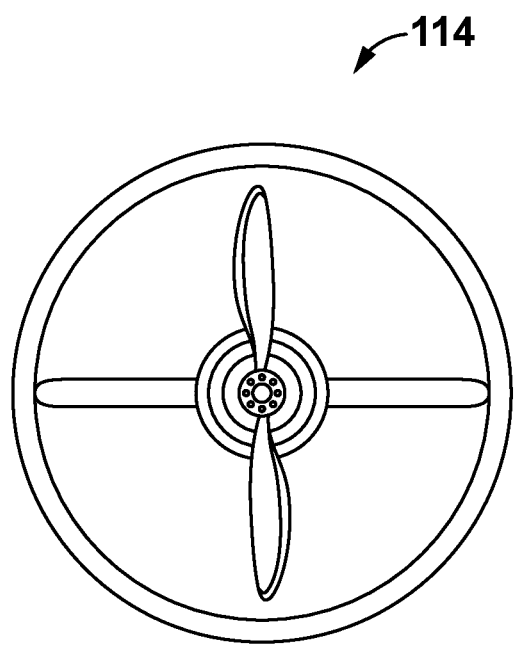
FIG. 9B illustrates a top view of a frisbee unit in yet another embodiment of the present invention.
Figure 10:
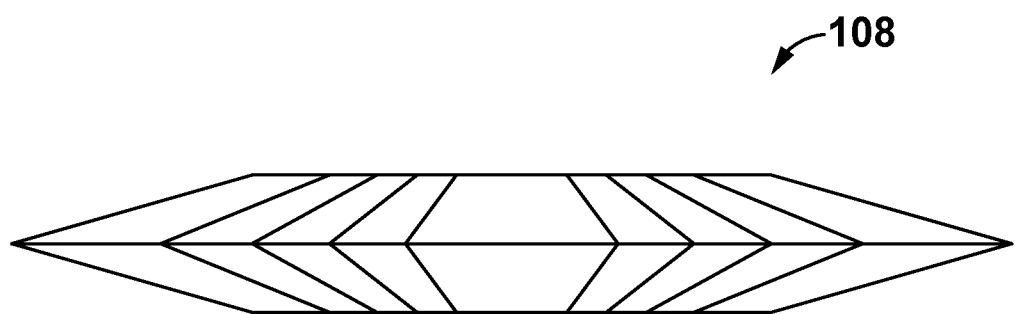
FIG. 10 illustrates a side view of the blade assembly of the drone in an embodiment of the present invention.

Referring to FIG. 8, the frisbee unit 114 comprises rotating blades disposed at the center of frisbee unit 114, in yet another embodiment of the present invention. Referring to FIG. 9A, a horizontal view of drone 100 is illustrated in yet another embodiment of the present invention. Referring to FIG. 9B, a top view of the frisbee unit 114 of the drone 100 is illustrated, in yet another embodiment of the present invention. Referring to FIG. 10, a side view of the blade 108 assembly of the drone 100 is illustrated in an embodiment of the present invention According to the present invention, the autonomous aerial vehicle system further comprises a management server in communication with the plurality of autonomous aerial vehicle (AAV) or autonomous drone (AD) via a wireless network.

In one embodiment, each autonomous aerial vehicle comprises a control module in communication with the management server and a wireless network module in communication with control module. The management server is configured to connect with the control module via the wireless network module. In an embodiment, each wireless network module comprises GSM and/or LoRa module to wirelessly connect with at least one aerial vehicle in relative proximity.

In an embodiment, the management server comprises a memory for storing data of each drone, and a processor coupled to the memory is configured to schedule a flight plan for the plurality of autonomous aerial vehicle and communicate the flight plan data to the plurality of autonomous aerial vehicle via a wireless network. In one embodiment, the management server could be accessed by system administrator or a user who have authority for access. In one embodiment, the flight plan data could be scheduled by the user. In one embodiment, the flight plan data comprises a flight schedule with precise direction and timestamp. in one embodiment, the flight plan data and information relating to the plurality of aerial vehicle is stored in the memory of the server.

In one embodiment, the autonomous aerial vehicle further comprises a memory module in communication with the control module is configured to store the received flight plan data. The management server is configured to receive notification from each drone on receiving the flight plan data.

In one embodiment, the working of the AAV is explained as follows. In one embodiment, the autonomous aerial vehicle is configured to be in low-power mode under non-operating mode. In one embodiment, the autonomous aerial vehicle (AAV) further comprises a real time clock (RTC) module in communication with the control module. The aerial vehicle is woken up at fixed time intervals and wirelessly connect with the control module of the at least one nearest AAV and check if a new data packet or flight plan data, designated to it, has been uploaded. The RTC module sends a signal to wake it up from the low power mode, at a designated time that is based on the configured time stamped event. Each control module will scan for all nearby Ads or AAVs and successively will pair with each one transmitting it specific data over the dedicated communication channel. In one embodiment, each AAVs comprises a unique ID.

The control module would request for the aerial vehicle to authenticate itself and send its local coordinates and the AAV will respond appropriately. The AAV checks the battery status and sends a notification regarding the battery status to the gateway control module. In one embodiment, the battery status could be fully charged, depleted or charged to a certain extent. After receiving the battery status, the control module sends several data packets for execution by the drone. The data packets from the control module are stored in the memory module and executes the information in the data packet. In one embodiment, the control module or controller board 200 hardware components are detailly explained in FIG. 11. Referring to FIG. 11 through FIG. 15, the autonomous aerial vehicle comprises essential printed circuit boards (PCBs) including controller board 200, motor board 300, camera board 400 and power board 500.

Figure 11:
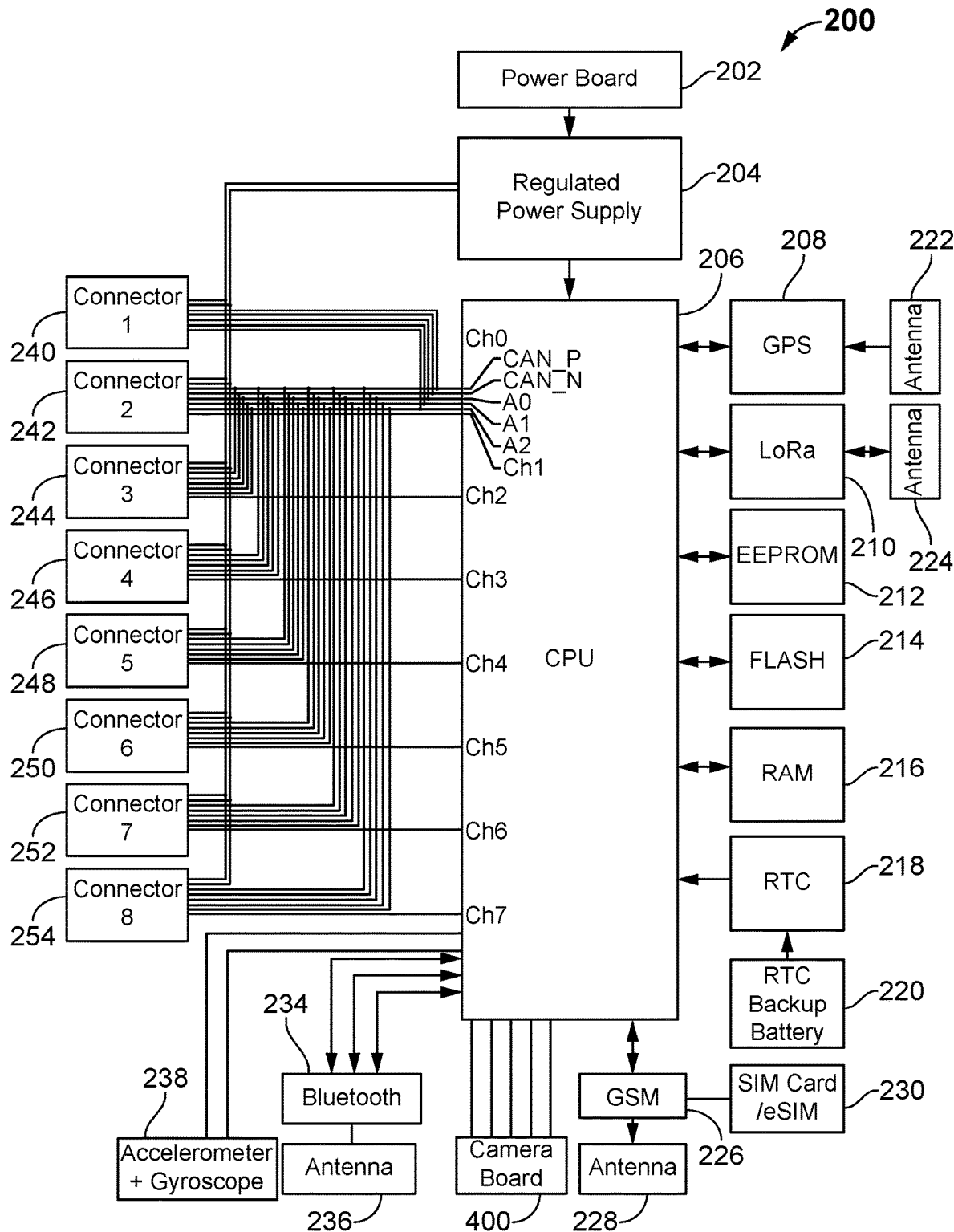
FIG. 11 illustrates a controller board of the autonomous aerial vehicle in an embodiment of the present invention.

Referring to FIG. 11, in one embodiment, the controller board 200 comprises plurality of ICs including but not limited to CPU 206, at least eight connectors (240, 242, 244, 246, 248, 250, 252, 254), regulated power supply 204, GPS module, LoRa module, EEPROM 212, FLASH 214, RAM 216, RTC module 218, RTC backup battery 220, GSM module, and Bluetooth low energy module. In one embodiment, the CPU 206 is configured to handle all software procedures, control and necessary computation within the AAV.

In one embodiment, the controller board 200 comprises at least eight connectors (240, 242, 244, 246, 248, 250, 252, 254) or connectors or 8-pin connector. At least two connectors are dedicated to the two main propellers, and at least six connectors are dedicated to the motors for the unique rotational mechanics. The main functionality of the connectors is to provide the control board 200, a flexibility to control all motors individually and with ease via a simple cable connection from these connectors to each motor board 300, shown in FIG. 12.

In one embodiment, at least two connectors are configured to provide power to each motor board module 300. In one embodiment, at least two connectors are configured to transfer data from the master controller CPU 206 to each module of the AAV. In one embodiment, controller area network (CAN) interface is used to transfer data for its relative simplicity and reliability. The CAN interface used with the master controller CPU 206 for sending/receiving data packets of predefined format and size, including start bit, identification information, core data, CRC and end bit.

The end connection of the 8-pin connector (pin 8) is referred as ChX. This pin is connected separately for every connector to the controller board CPU 206. Upon initial power-up the connector performs the same purpose as of the at least eight connectors (240, 242, 244, 246, 248, 250, 252, 254) of the controller module 200. During normal operation, ChX triggers (poll or interrupt) each motor board 300 and request additional action. ChX is used to interrupt the operation of one of the motor modules and trigger the proper interrupt software procedure on the motor module's side. During this procedure the master CPU 206 will request from the Motor board 300 identification data to be sent over the communication channel, describing parameters such as unique ID, motor type and etc. The CPU 206 collects all information necessary for operation of the AAV by checking the status of the all motor modules, wherein the information comprises if all motors are fully operational, if a fault has been detected and at what board is it present on, basic diagnostics and etc. CPU 206 gathers all the essential to provide driving commands to each motor. If an issue has been detected, the main CPU 206 has the authority to stop the AAV from taking off and take further actions, e.g., send status messages to the drone controller module.

In one embodiment, the regulated power supply module 204 is configured to supply regulated power to all of the controller board's ICs. In one embodiment, the GPS module comprises GPS 208 and antenna 222 configured to provide location position to the AAV. In one embodiment, the LoRa module comprising LoRa 210 and antenna 224 for achieving a long distance, wireless, non-cellular communication with any nearby LoRa gateway-based drone controller module. In one embodiment, all configuration information essential for the specific drone will be stored in the EPROM 212. In one embodiment, all information concerning flight destinations, current timeline schedule etc. will be stored and read from the FLASH 214 memory. In one embodiment, external RAM 216 is provided for use with the internal master controller CPU 208.

In one embodiment, the RTC module 218 is provided with the CPU with the real local time. In one embodiment, RTC backup battery 220 is configured to provide power to the RTC 218 even when the drone has been turned off. In one embodiment, the GSM 226 module comprises GSM antenna 228 for achieving a long distance, wireless, cellular communication with any nearby GSM based drone controller module. In one embodiment, the Bluetooth Low Energy (BLE) module or SoC comprises Bluetooth 234 and antenna 236 allow certain users (system supporting users), who have an installed Android or iOS based mobile APP to connect to the drone.

In one embodiment, the AAV comprises accelerometer and gyroscope 238 to detect acceleration in either axis and stability of the autonomous aerial vehicle. In an embodiment, the controller board 200 is powered from an external DC source. The controller board 200 connect with the management server and acts an intermediate between the server and the plurality of AAV.

Figure 12:
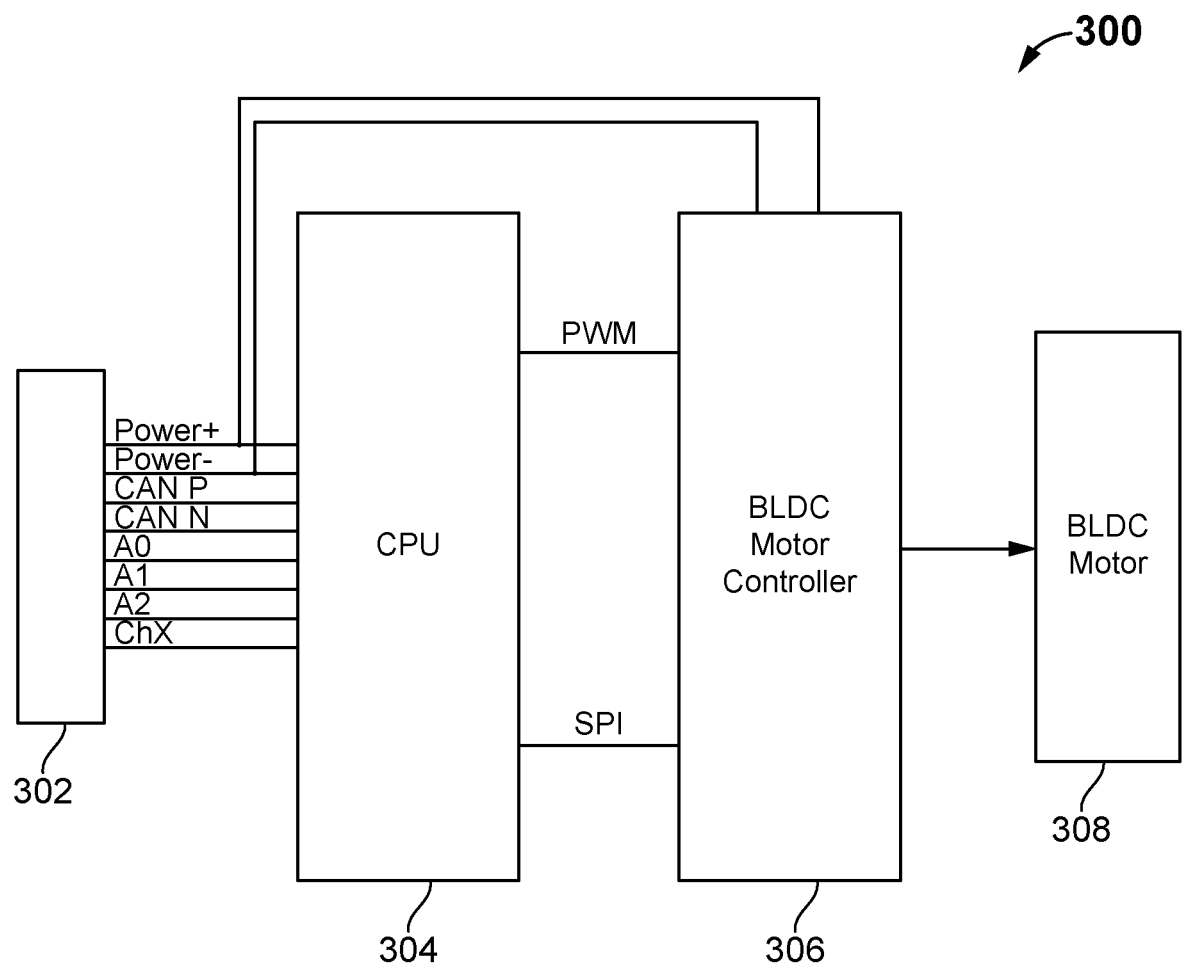
FIG. 12 illustrates a motor board of the autonomous aerial vehicle in an embodiment of the present invention.

Referring to FIG. 12, each motor board 300 is placed near the motor. In one embodiment, the motor board 300 includes 8-pin connector 302, CPU 304, and a motor controller. In one embodiment, the motor is a BLDC motor 308. In one embodiment, the motor controller is a BLDC motor controller 306. In one embodiment, the 8-pin connector 302 is configured to route power and control signals as explained in FIG. 11. In one embodiment, the CPU 304 is a small low power CPU, which would handle locally the driving information which was sent from the controller boards CPU 206. The CPU 304 provides the BLDC motor controller 306 with a data stream or information form controller boards CPU 206 via a PWM or SPI type-based connectivity between the two ICs, the CPU 304 and BLDC motor controller 306. In one embodiment, the BLDC motor controller 306 drives the BLDC motor 308.

Figure 13:
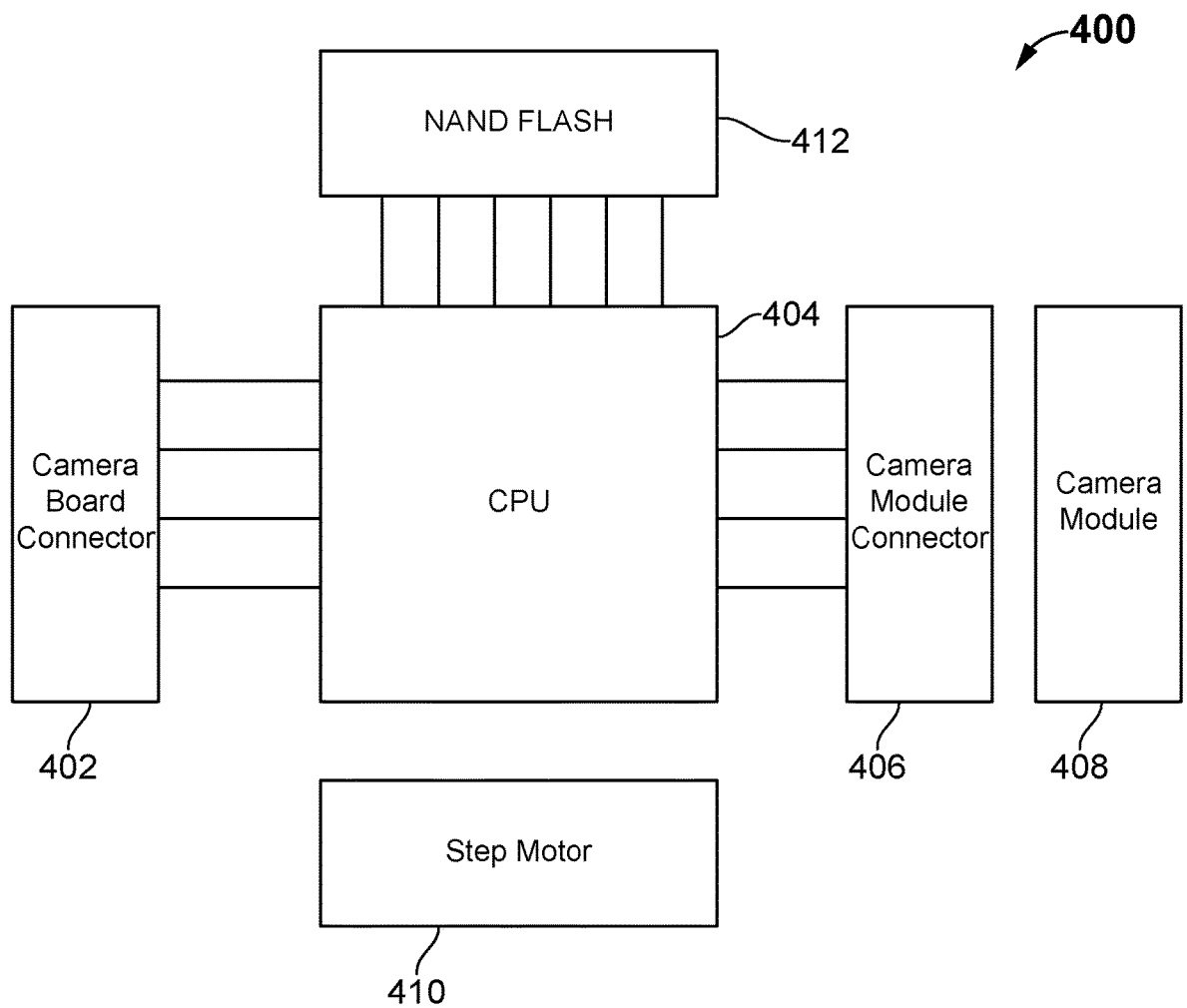
FIG. 13 illustrates a camera board of the autonomous aerial vehicle in an embodiment of the present invention.

Referring to FIG. 13, the camera board 400 comprises camera board connector 402, CPU 404, camera module 408, camera module connector 406, step motor 410 and NAND FLASH 412. In one embodiment, the camera board 400 would be connected with the controller board 200 via a communication interface, shown in FIG. 11. In one embodiment, the camera board 400 connector is used to supply power to camera board 400. In one embodiment, the CPU/local microcontroller 404 is configured to handle communication with the controller board CPU 206, storage of images (potentially video) captured by the camera module 408 within the NAND FLASH 412, and communication with the camera module 408. In one embodiment, the camera module 408 is provided with power from the camera board 400 or through wires from the Power board 202 of the controller board 200, shown in FIG. 11. The camera module 408 communicates with the camera board CPU 404 via a specified communication interface. The link between the camera module 408 and the camera module connector 406 will be through a flex cable. In one embodiment, to achieve free 360-degree rotation of the camera, a step motor 410 is provided. This step motor 410 is controlled by the local camera board CPU 404 and will provide rotational motion to some mechanically rotating parts, thus allowing for fully electrically controlled rotation mechanism.

In one embodiment, the camera is a "fish eye" type camera being constructed with several smaller cameras with smaller overlapping viewing angles. Further, using specialized image processing software, the data output stream of each camera could be combined and reconstructed into a larger image out of each individual camera's footage, taking into account the overall overlapping of each taken image. This way it is possible to construct a camera module 408 with a very high viewing angle of up to 180 degrees.

Figure 14:
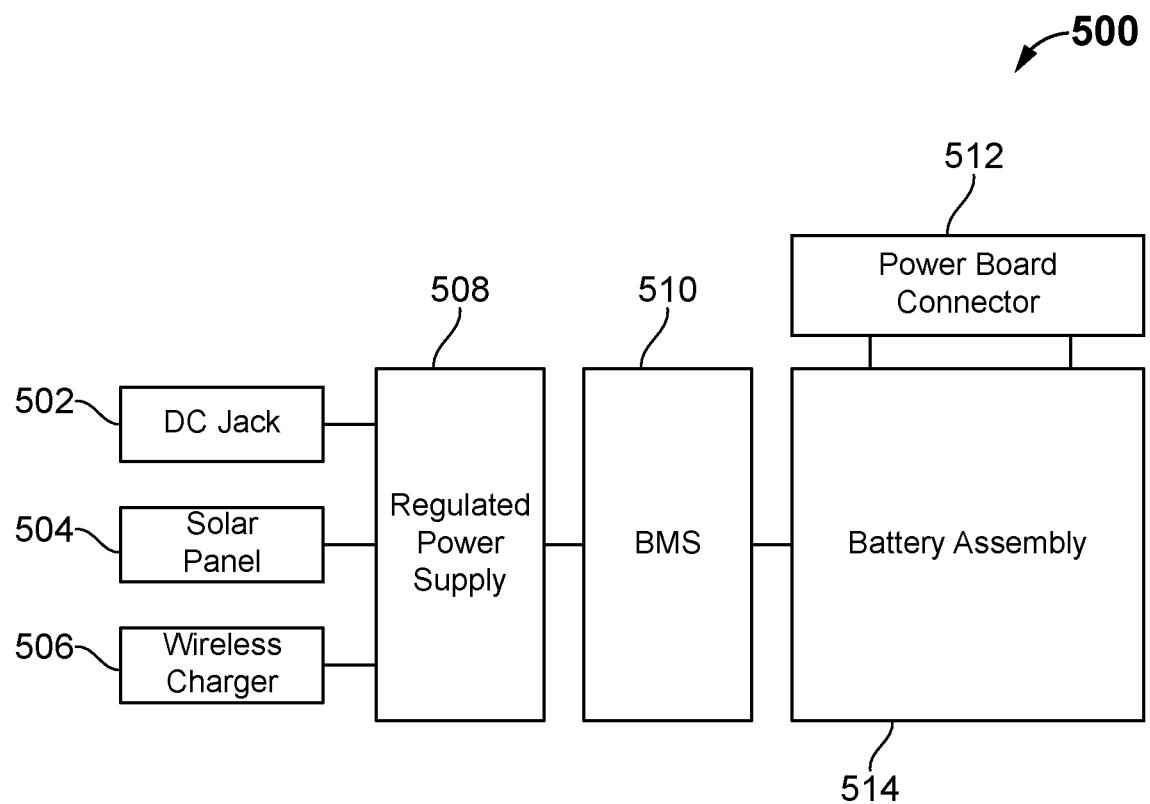
FIG. 14 illustrates a power board of the autonomous aerial vehicle in an embodiment of the present invention.

Referring to FIG. 14, the power board 500 comprises a battery assembly 514, battery management system 510 and regulated power supply 508. In one embodiment, the battery assembly 514 comprises a number of lithium batteries, connected with each other. In one embodiment, the battery assembly 514 is connected to all external circuitry via the power board connector 512. In one embodiment, the battery assembly 514 supports high charge current and requires only a smaller amount of time for charging. In one embodiment, the battery assembly 514 provide a high supply discharge current in order to be able to charge AD drones as fast as possible.

In one embodiment, the battery management system (BMS) 510 supports active or passive battery cell balancing. It is added to the power board 500 due to the necessity of balancing the stored energy within all internal battery assembly 514, thereby, prolongs the life, avoids thermal instability within the battery assembly 514 and prevents degradation of the operation. In one embodiment, the regulated power supply 508 converts the inputted power and transfers it to the BMS 510. In an embodiment, the regulated power supply 508 receives power from DC jack 502, solar panel 504 and wireless charger 506.

Figure 15A:
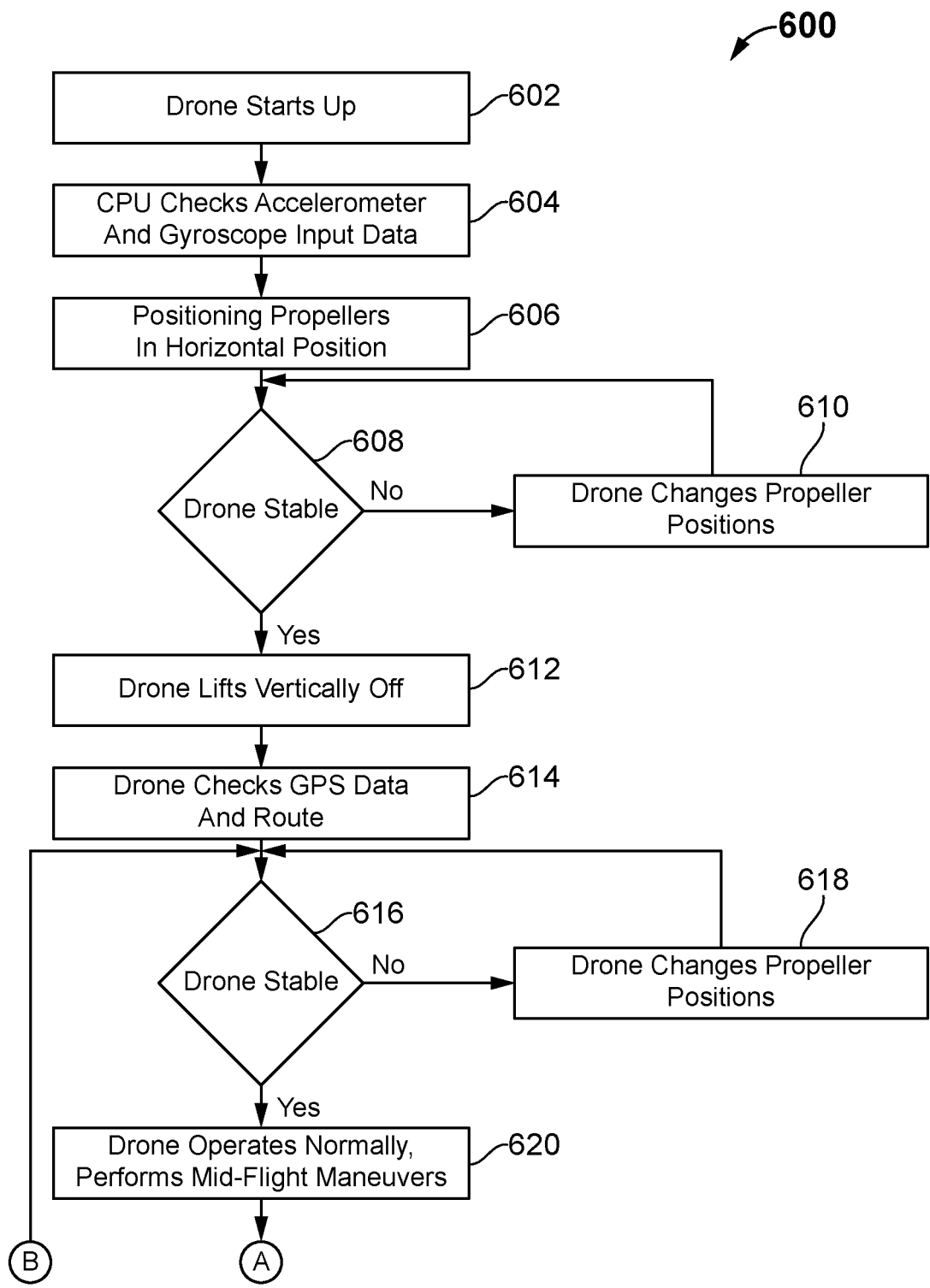
FIG. 15 is a flowchart illustrating midflight operation of the autonomous aerial vehicle in an embodiment of the present invention (shown as FIG. 15A and FIG. 15B).
Figure 15B:
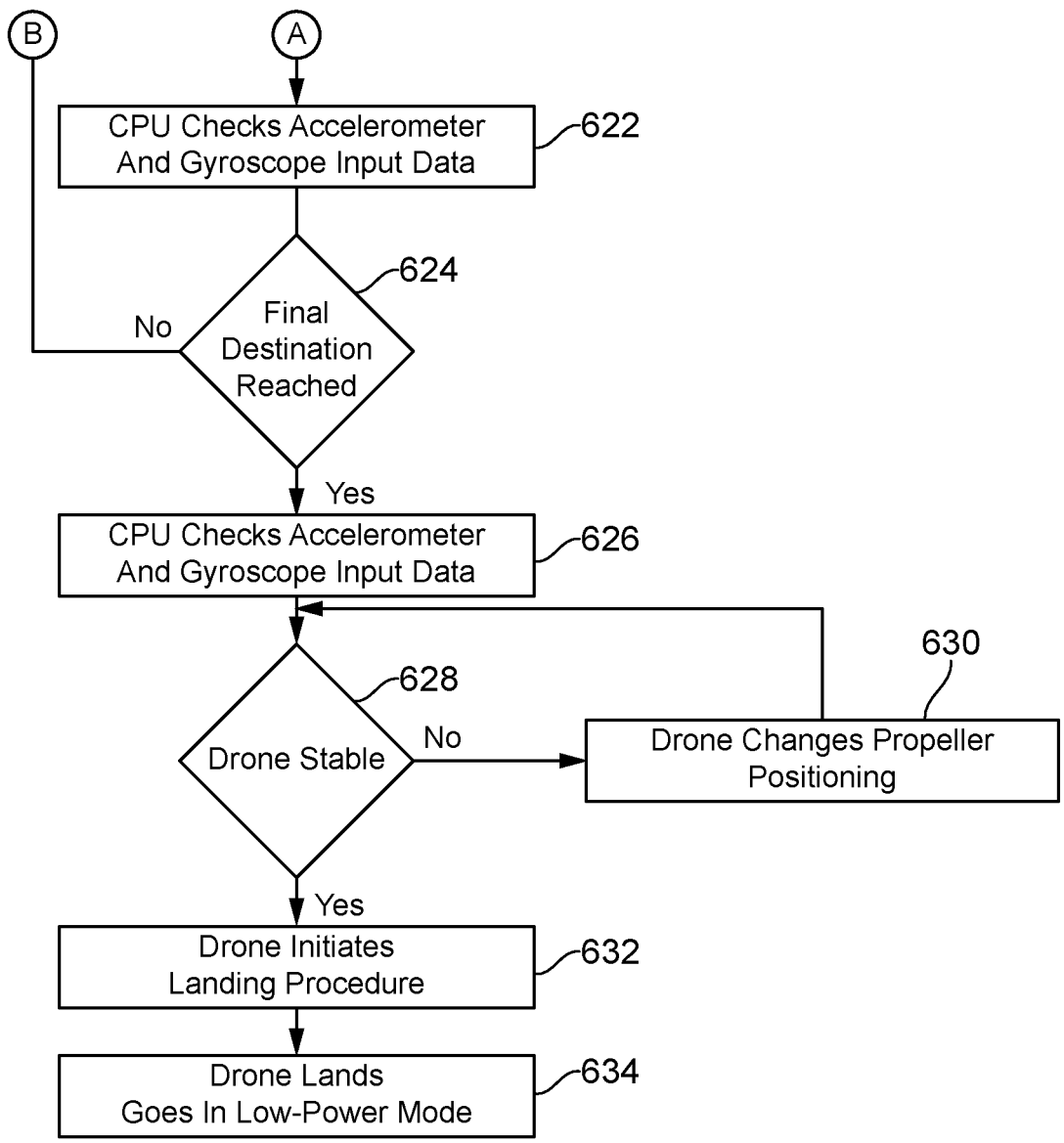

Referring to FIG. 15, a flowchart 600 illustrating mid-flight operation of the autonomous aerial vehicle in an embodiment of the present invention. At step 602, the autonomous aerial vehicle such as drone 602 awakes from the low power mode. At step 604, the CPU 206 of the controller board 200 checks position data of the drone via the accelerometer and gyroscope. At step 606, the propellers of the drone are positioned in horizontal position. At step 608, the stability of the drone is checked. At step 610, if the drone is not stable, propeller positions are changed to provide stability. At step 612, once the drone is stable, the drone is enabled to lift off vertically. At step 614, GPS data and the flight plan data are checked.

At step 616, the stability of the drone is checked. At step 618, if the drone is not stable, propeller positions are changed to provide stability. At step 620, once the drone is stable, the drone operates normally and perform mid-flight maneuvers. At step 622, the CPU 202 of the drone controller board 200 checks accelerometer and gyroscope data. At step 624, the drone is configured to check, if the final destination is reached. If the drone does not reach its final reach, stability and propeller position of the drone is checked to perform mid-flight maneuvers. At step 626, on reaching the final destination, the CPU checks input data of accelerometer and gyroscope 206. At step 628, the drone is checked for its stability. At step 630, if the drone is not stable, propeller position of the drone is changed. At step 632, if the drone is stable, landing procedure for drone is initiated. At step 634, the drone lands and enters low-power mode.

Figure 16:
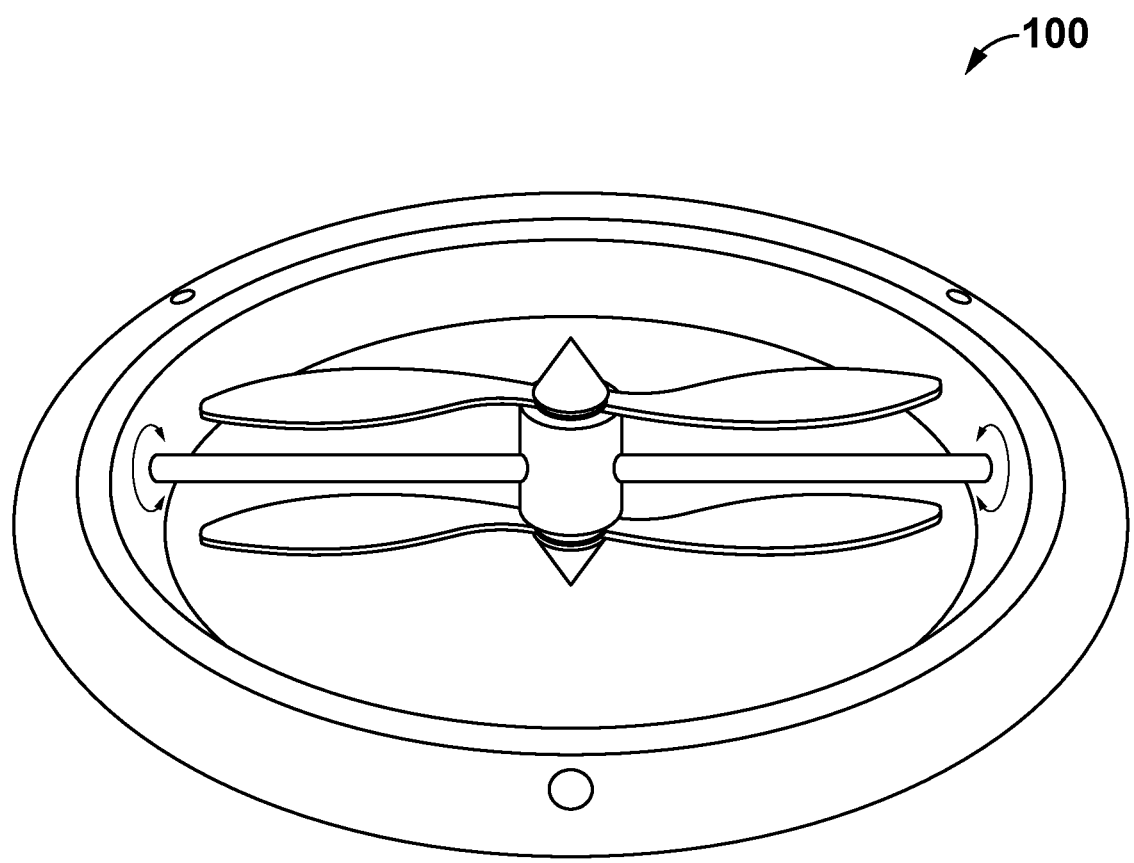
FIG. 16 illustrates a perspective view of the autonomous aerial vehicle in an embodiment of the present invention.
Figure 17:
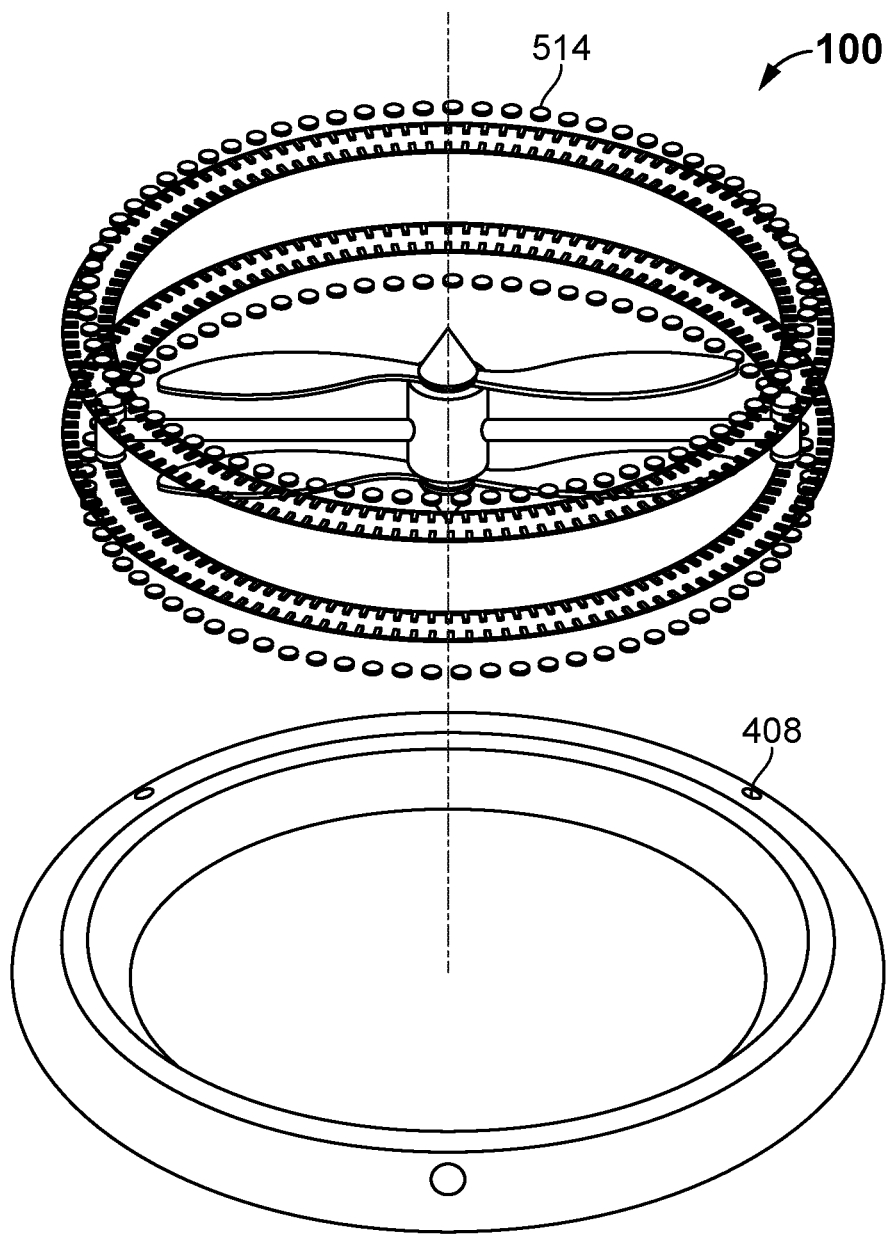
FIG. 17 illustrates an exploded view of the autonomous aerial vehicle in an embodiment of the present invention.

Referring to FIG. 16 and FIG. 17, the battery assembly 514 is disposed in a cyclical arrangement. In one embodiment, the battery assembly 514 is disposed within a maneuvering rod inside the cyclical hull of the drone 100. The drone 100 comprises at least two inner gear rings, wherein at least one gear ring disposed at top of a hull of the drone 100 and at least one gear ring disposed at bottom of the hull of the drone 100. In one embodiment, the camera module 408 comprising camera is disposed on the outer hull of the drone 100. The cameras could also be motorized to move with the subject that is being viewed. The camera could be rotated by 360° by rotating the outer hull of the drone independently.

Referring to FIG. 18, the hull or housing having a frisbee like structure (also referred as cyclical ring arrangement 700) could be assembled to air vehicle. The cyclical ring arrangement 700 is assembled to an air vehicle 704. In one embodiment, the cyclical rings 700 are configured to provide instantaneous rotation or maneuverability in any direction for the air vehicle 704. In one embodiment, the cyclical rings 700 adaptable to rotate the air vehicle 704 around 360° in a horizontal axis, that will enable the most efficient maneuverability for the air vehicle 704. In one embodiment, the air vehicle 704 could be rotated around the circumference of the cyclical rings 700 and maneuver instantaneously in any direction whilst in the mid-air. Maneuverability is defined as the ability to change the flight direction of the air vehicle 704. In one embodiment, the air vehicle 704 includes but not limited to, an aircraft, airplane, helicopter, unmanned aerial vehicle (UAV), and drones.

In one embodiment, the cyclical ring arrangement 700 comprises at least two cyclical rings. The at least two cyclical rings are an inner cyclical ring and an outer cyclical ring. The at least two cyclical rings adjoins to form a cyclical shell structure. The cyclical rings are connected each other via a plurality of blades 702. In one embodiment, the at least two cyclical rings could be adjoined by any other means. A multiplicity of batteries is disposed on the outer cyclical ring. In one embodiment, at least one motor could be coupled to the cyclical rings 700. In one embodiment, the outer structure of the air vehicle 704 could be joined to the at least 1 external motor of the cyclical rings 700. In another embodiment, the outer structure of the air vehicle 704 could be joined to at least two external motors, which will rotate the air vehicle 704 around the circumference of the cyclical rings 700 and enables an instantaneous rotation or maneuverability of the air vehicle 704.

Referring to FIG. 19, the cyclical ring arrangement 700 is affixed to underneath the main body of the air vehicle 704 such as helicopter. In one embodiment, a plurality of spokes 706 of the helicopter is extended outwardly and affixed to the top portion of the cyclical rings 700. The edges of the structure will have in 40 minutes protruding and attached queueing to motors that maneuver cyclically around the outer circumference. The plurality of spokes 706 of the helicopter facilitates easy maneuver of the helicopter. The cyclical rings 700 are attached to the front and back portion of the body of the helicopter via the plurality of spokes 706. In one embodiment, at least two motors are coupled to cyclical rings 700. In one embodiment, the helicopter with the cyclical rings 700 could be supported and stabilized on supporters.

In one embodiment, the configuration of the helicopter enables to complete the maneuver in a shorter time. In one embodiment, the helicopter with the cyclical rings 700 could attain the rotation of 360° instantaneously in horizontal direction. The configuration of the helicopter is capable of attaining greater load factors when flying a pullup-pushover maneuver. The entire structure of the helicopter could rotate around the circumference of the cyclical rings 700. This configuration of the helicopter 106 could maneuver 360° horizontal rotation with optimal efficiency while in the mid-air. In one embodiment, the cyclical rings 700 are a light weight structure. The spokes that are attached to the respective motors encased within the cyclical rings 700 to be entirely stress-free of the total weight of the helicopter 106. The arrangement of the cyclical rings 700 is non-stationary and has gained lift off from the ground.

In one embodiment, the body of the respective air vehicle (shown in FIG. 18) or aircraft 704 (shown in FIG. 19) could maneuver around the inner or outer circumference of the cyclical rings 700. The cyclical rings 700 could provide most aerodynamic efficiency for the aircrafts, helicopters, and UAVs and that could exponentially maneuver at high speeds. In some embodiments, the cyclical rings 700 could be adopted in the gyroscopic drones.

According to the present invention, LoRa technology comprises a following advantages: covers distance of 15 km surpassing almost all conventional non-cellular based wireless technologies; low power consumption; comprises high-capacity connection that is up to 1 million node devices for controlling multiple devices simultaneously; reduced synchronization overhead and without hops in the mesh network; secured and efficient network; and high immunity to interference.

According to the present invention, the system comprises a mobile service app. The mobile service application enables the user to unlock and lock each drone. The mobile service app is provided to users with supervisory/support rights or system supporting user (SSU). The mobile service app connects via the Bluetooth channel to controller board 200 of each AAV. The software unlocking procedure could be accessed by SSUs who have authority to change internal hardware, reprogram (update internal software) and enable drone device. Any other user who tries to implement changes into the hardware or embedded software, without having the proper authority, would be unable to start up the device. The system will additionally support encryption, secure communication and special software procedures, with which the device internally checks the changed hardware parts or software and would check their origin, to prevent an SSU from attaching unlisted (replica) parts onto the device.

In one embodiment, the system comprises a mobile charging station and a stationary charging station. A drone with high battery capacity is configured to acts a mobile charging station. When a battery depleted AAV detects that a mobile charging drone is in close proximity, it couples magnetically with the mobile charging station and turns off all large power consuming processes and charges the battery either wirelessly or physically via a plug-in type power connector. In one embodiment, the battery depleted AAV detects the mobile charging station by communicating with the nearest gateway to determine a local position of the nearest charging station. In one embodiment, stationary charging stations would be located in certain places, where each drone could land there safely and be charged wirelessly for a certain duration of time.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications could be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms could be employed herein, they are used only in generic and descriptive sense and not for purposes of limitation. Accordingly, the present invention is not limited to the specific embodiments illustrated herein.

What is claimed is:

1. An autonomous aerial vehicle system, comprising:
  a plurality of autonomous aerial vehicles, each of the plurality of autonomous aerial vehicles comprising at least two propellers configured to rotate in 360-degree;
  a management server in communication with the plurality of autonomous aerial vehicles via a wireless network, including:
    a memory for storing data of each of the plurality of autonomous aerial vehicles, and
    a processor coupled to the memory, configured to:
      schedule a flight plan for the plurality of autonomous aerial vehicles;
      communicate flight plan data of the flight plan to the autonomous aerial vehicles, receive notification from each of the plurality of autonomous aerial vehicles on successful communication of the flight plan data;
  wherein each of the plurality of autonomous aerial vehicles comprises:
    a control module in communication with the management server configured to receive the flight plan data,
    a memory module in communication with the control module configured to store the flight plan data,
    a plurality of sensors in communication with the control module configured to receive position data of the respective autonomous aerial vehicle,
    a power module comprising a battery assembly configured to check a battery status and send the status to the control module, wherein the battery assembly has high battery capacity and is configured to act as a mobile charging station, wherein at least one different one of the plurality of autonomous aerial vehicles is configured to magnetically couple with the mobile charging station for charging batteries, and wherein the battery assembly is configured to wirelessly charge in a stationary charging station, wherein when the battery status is battery depleted, the control module is configured to control the respective autonomous aerial vehicle to detect one of the plurality of autonomous aerial vehicles in close proximity to charge the battery assembly, and to communicate with the management server to detect if the stationary charging station is in a closer proximity than the one of the plurality of autonomous aerial vehicles to charge the battery assembly, and a camera module in communication with the control module configured to rotate in 360 degrees and capture aerial photographs;

wherein the control module of each of the plurality of autonomous aerial vehicles is configured to:

awake the respective autonomous aerial vehicle from a low power mode, communicate with at least one other one of the plurality of autonomous aerial vehicles to check for updates of the flight plan data, store the flight plan data in the memory module of the respective autonomous aerial vehicle, and operates the respective autonomous aerial vehicle according to the flight plan data.

2. The autonomous aerial vehicle system of claim 1, wherein each of the plurality of autonomous aerial vehicles comprises a unique ID.

3. The autonomous aerial vehicle system of claim 1, wherein each of the at least two propellers comprises a propeller motor controlled by motor controller.

4. The autonomous aerial vehicle system of claim 1, wherein the at least two propellers of each of the plurality of autonomous aerial vehicles rotates in opposite directions to one another to provide stability to the autonomous aerial vehicle.

5. The autonomous aerial vehicle system of claim 1, wherein each of the at least two propellers comprises a frisbee like structure.

6. The autonomous aerial vehicle system of claim 1, wherein the plurality of autonomous aerial vehicles are in communication to one another via the wireless network.

7. The autonomous aerial vehicle system of claim 1, wherein each of the plurality of autonomous aerial vehicles comprises a real time clock module.

8. The autonomous aerial vehicle system of claim 1, wherein the control module is further configured to:

check position data of each of the plurality of the autonomous aerial vehicles through the plurality of sensors, and send instructions to position the at least two propellers in a horizontal position to operate the plurality of autonomous aerial vehicles according to the flight plan data.

9. The autonomous aerial vehicle system of claim 1, wherein each of the plurality of autonomous aerial vehicles further comprises a GPS module in communication with the control module, which is configured to determine the location of the autonomous aerial vehicle.

10. The autonomous aerial vehicle system of claim 1, wherein the control module is further configured to:

monitor location data and position data of the autonomous aerial vehicle till completion of the flight plan.

11. The autonomous aerial vehicle system of claim 1, further comprises at least one stationary charging station.

12. The autonomous aerial vehicle system of claim 1, wherein each of the plurality of autonomous aerial vehicles supports encryption communication to prevent tampering of the respective aerial vehicle.

13. The autonomous aerial vehicle system of claim 1, wherein the flight plan data comprises a flight schedule with precise direction and timestamp.

14. The autonomous aerial vehicle system of claim 1, wherein the plurality of sensors comprises gyroscope and accelerometer sensor.

* * * * *